W. F. HOLT.
STEERING BAR LOCK.
APPLICATION FILED JUNE 7, 1915.
1,169,402.
Patented Jan. 25, 1916.
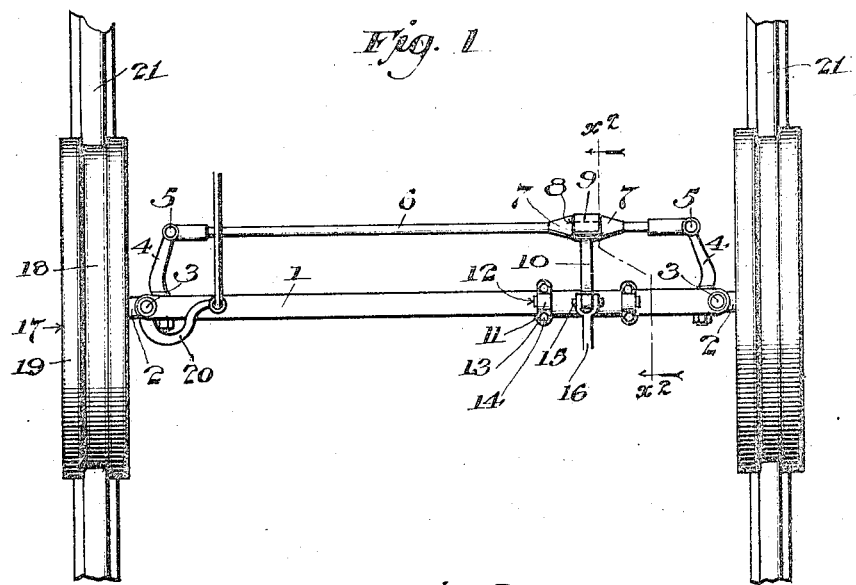
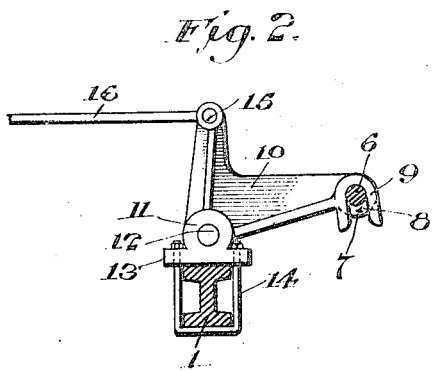
Witnesses:
Inventor:
William F. Holt

UNITED STATES PATENT OFFICE.

WILLIAM F. HOLT, OF REDLANDS, CALIFORNIA.

STEERING-BAR LOCK.

1,169,402.  Specification of Letters Patent.  Patented Jan. 25, 1916.

Application filed June 7, 1915. Serial No. 32,496.

*To all whom it may concern:*

Be it known that I, WILLIAM F. HOLT, a citizen of the United States, residing at Redlands, in the county of San Bernardino and State of California, have invented a new and useful Steering-Bar Lock, of which the following is a specification.

This invention relates to means for locking the steering wheels of a dirigible vehicle in straight-ahead position so that the vehicle can be run either as a dirigible vehicle controlled by the driver after the manner of automobiles on the ordinary street or roadway, and so that the vehicle can be run on rails which act as the sole guiding means, and it is noted, for example, that the invention is especially serviceable in connection with my improved vehicle wheel in my application filed June 7, 1915, Serial No. 32,495 said wheel having two treads or tires, one for rail traction and one for street traction.

An object of this invention is to make provision for securely and releasably locking the steering wheels of the vehicle against lateral deflection.

Another object is to effect the locking by simple and reliable mechanism.

Other objects and advantages may appear as the invention is unfolded in the subjoined detail description.

Figure 1 is a plan view embodying the invention. Fig. 2 is an elevation partly in section on line indicated by $x^2$—$x^2$, Fig. 1.

There is provided a steering axle comprising the main axle 1 and stub axles 2 pivoted by knuckles 3 to the main axle in the usual or any preferred construction of automobile axles. The stub axles 2 are provided with steering arms 4 pivoted at 5 to the opposite ends of a steering bar 6. The steering bar 6 is provided at suitable points therealong with spaced apart outwardly tapered collars or stops 7 forming therebetween a notch 8 to receive the U-shaped fork 9 of a bell crank lever 10, said fork embracing the axle 6. The taper of the collars enables the fork 9 to ride over the collars and into the notch.

The bell crank lever 10 is provided with a bearing 11 journaled on a shaft or pivot 12 which has its ends inserted in brackets 13 fixed by U-bolts 14 or the like to the axle 1. The bell crank lever 10 is pivoted at 15 to an operating rod 16 which may be extended to within reach of the driver of the vehicle and may, if desired, be provided with any suitable system of levers or other operating mechanism, not shown.

The stub axles 2 are provided with wheels 17 of any suitable construction, said wheels in the instance shown being of the type set forth in my co-pending application for vehicle wheel, filed June 7, 1915, Serial No. 32,495, which wheels are provided with track treads 18 and street treads 19 of larger diameter than the track treads. The particular construction of the wheels 17 is not claimed herein and therefore need not be described in detail, but said construction is shown, described and claimed in the above mentioned co-pending application.

In practical operation, it is obvious that if the driver of the vehicle is operating the vehicle on an ordinary street or pavement, he will manipulate the rod 16 to cause the fork 9 to disengage the notch 8 as indicated in dotted lines, Fig. 2, so that the steering bar 6 is free to be moved by the arm 20 of the steering mechanism in a manner well understood in the art, and therefore not necessary to show and describe in detail herein.

If the driver desires to run the vehicle along the rails 21, he will manipulate the rod 16 to move the fork 9 into engagement with the notch 8 between the collars 7, as in the drawings, thus preventing endwise movement of the steering bar 6, and consequently holding the wheels 17 in their straight-ahead positions.

The foregoing will enable those skilled in the art to make and operate the device.

What I claim is:

1. In combination, a main axle, stub axles pivoted to the main axle and provided with wheels, steering arms for the stub axles, a steering bar connecting the steering arms to one another and provided with a notch, a lever designed to releasably engage the notch to prevent endwise movement of the steering bar, and means to move the lever.

2. In combination, a main axle, stub axles pivoted to the main axle and provided with wheels, steering arms for the stub axles, a steering bar connecting the steering arms to one another, spaced apart outwardly tapered collars on the steering bar, a lever having a fork designed to engage the steering bar between the collars, and means to operate the lever to disengage the fork from the steering bar.

3. In combination, a main axle, stub axles pivoted to the main axle and provided with wheels, steering arms for the stub axles, a steering bar connecting the steering arms to one another, collars fixed on the steering bar, a bell crank pivoted to the axle and provided with a fork designed to engage the axle between the collars and bear against said collars to prevent endwise movement of the steering bar, and an operating rod pivoted to the bell crank lever.

In testimony whereof, I have hereunto set my hand at Los Angeles, California, this 28th day of May, 1915.

WILLIAM F. HOLT.

In presence of—
GEORGE H. HILES,
LORA M. BOWERS.

Copies of this patent may be obtained for five cents each, by addressing the "Commissioner of Patents, Washington, D. C."